United States Patent
Trenkle

(10) Patent No.: US 6,356,645 B1
(45) Date of Patent: Mar. 12, 2002

(54) ELECTROACOUSTIC TRANSDUCER FOR A HEADREST LOUDSPEAKER

(75) Inventor: Elvira Trenkle, Steinenbronn (DE)

(73) Assignee: PVT Prazisions-Verbindungstechnik und Steuerungsbau GmbH (DE)

( * ) Notice: Subject to any disclaimer, the term of this patent is extended or adjusted under 35 U.S.C. 154(b) by 0 days.

(21) Appl. No.: 09/195,807

(22) Filed: Nov. 19, 1998

(30) Foreign Application Priority Data

Nov. 22, 1997 (DE) .......................................... 197 51 920

(51) Int. Cl.[7] .............................................. H04R 25/00
(52) U.S. Cl. ...................... 381/389; 381/86; 381/365; 181/141; 379/430; 455/345
(58) Field of Search .................. 381/94, 386, 390, 381/389, 370, 375, 376, 86, 71.6, 361, 362, 365; 455/66, 90, 99, 345, 344, 350; 379/430

(56) References Cited

U.S. PATENT DOCUMENTS

| | | | | |
|---|---|---|---|---|
| 3,512,605 A | * | 5/1970 | McCorkle | 381/389 |
| 3,944,020 A | * | 3/1976 | Brown | 181/141 |
| 4,038,499 A | * | 7/1977 | Yeaple | 381/86 |
| 4,042,791 A | * | 8/1977 | Wiseman | 381/389 |
| 4,075,438 A | * | 2/1978 | Kappel | 381/86 |
| 4,388,492 A | * | 6/1983 | Sato | 381/389 |
| 4,450,495 A | * | 5/1984 | Naruki | 455/90 |
| 4,490,842 A | * | 12/1984 | Watanabe | 381/389 |
| 4,638,884 A | * | 1/1987 | Lee | 181/141 |
| 4,641,345 A | * | 2/1987 | Takahashi | 381/86 |
| 4,974,759 A | * | 12/1990 | McDonough | 455/99 |
| 5,094,316 A | * | 3/1992 | Rosen | 181/141 |
| 5,559,893 A | * | 9/1996 | Krokstad et al. | 381/86 |
| 5,687,230 A | * | 11/1997 | Olausson et al. | 381/86 |
| 5,771,305 A | * | 6/1998 | Davis | 381/389 |
| 5,887,071 A | * | 3/1999 | House | 381/386 |
| 6,052,603 A | * | 4/2000 | Kinzalow et al. | 455/90 |
| 6,094,496 A | * | 7/2000 | Stowers, Sr. | 381/362 |

* cited by examiner

Primary Examiner—Sinh Tran
Assistant Examiner—P. Dabney
(74) Attorney, Agent, or Firm—Baker Botts LLP

(57) ABSTRACT

An electroacoustic transducer unit for a handsfree device in a vehicle includes a loudspeaker, a microphone and a connection to a mobile phone. The microphone can be mounted on a flexible bracket. The unit is constructed for positioning in the upper seatback area of a seat of the vehicle. One way of positioning is an elongated casing with two recesses at both ends and a spring device at one end. The casing can be inserted between the headrest carriers and is elastically fixed to it.

30 Claims, 2 Drawing Sheets

ELECTROACOUSTIC TRANSDUCER FOR A HEADREST LOUDSPEAKER

FIELD OF APPLICATION AND PRIOR ART

The invention relates to an electroacoustic transducer unit for a handsfree device in a vehicle, particularly for the connection to a mobile telephone as the transmission device.

Handsfree devices are very widely used for telephoning in a vehicle, because the user then does not have to hold the mobile telephone in the hand. This is of major importance, to enable him to devote his entire attention to the road traffic and to the steering of the vehicle.

Apart from a type of base station, generally comprising a support for the mobile telephone together with the installed handsfree electronics, known handsfree devices in vehicles have a microphone and a loudspeaker, which are to be connected thereto. Microphones of known handsfree devices are normally fixed to the A-support or panel, partly also to or behind the steering wheel. The loudspeakers are generally constituted by smaller modules, which either have to be fixed in a very complicated manner to the panel or even in the foot space of the passenger. This is due to the fact that for avoiding interference, as well as feedback and echo, there must be no direct, linear acoustic connection between the loudspeaker and microphone of the handsfree device. These extremely disturbing effects more particularly occur in full duplex operation. Besides the fitting of the microphone, the installation of the loudspeaker at an inaccessible location, such as the foot space, is considered to be very disadvantage, inter alia because it is exposed there to dirt and a damage risk.

PROBLEM AND SOLUTION

The problem of the invention is to provide an electroacoustic transducer unit for a handsfree device, which can be easily fitted, retrofitted and which is operationally reliable.

According to the invention this problem is solved by claim 1. The transducer unit or transducer can be positioned close to the head, mouth or ear of a person sitting in the seat and can be fitted to the seat or vehicle. As opposed to a head mount, e.g. an earphone, the transducer unit does not impede the user and when fitted behind the head it is scarcely optically noticed. In particular, the electroacoustic transducer unit has at least one loudspeaker. As a result of the very short transmission path to the ear, it is possible to keep the sound volume low and to drown the disturbing noises occurring in a vehicle.

The transducer unit preferably has a holder or support for fixing to the seat or vehicle, preferably in the vicinity of the headrest of the seat and at least partly between the headrest and seatback. Numerous fixing or fastening possibilities are available.

In particularly preferred manner the support is constructed for fixing to at least one headrest carrier of a headrest and the in particular manual fastening can be released. Thus, use is made of the free space present with most vehicle seats between the lateral headrest carriers and the headrest and seatback or one of the indicted components for housing or fixing the transducer unit. The transducer unit for this purpose can be fixed to and in particular at least partly between two headrest carriers. In the case of the normally columnar headrest carriers, they permit a particularly advantageous fixing. It is advantageously possible to fix and/or release without tools the transducer unit with support and with particular preference it is lockable or clampable. A further fitting possibility is to the vehicle roof, e.g. to the sliding roof, or to the B-support.

According to an embodiment of the invention, the electroacoustic transducer unit has a housing or casing for receiving at least one loudspeaker. The latter is preferably shock absorbing to the outside for safety reasons, preferably as a result of a fitted or enveloping cushioning. It is also possible to have a casing made from shock absorbing material, particularly hard or rigid foam materials and the like. Particularly the areas which in the fixed state are directed towards the front and rear in the vehicle longitudinal direction, can be resilient and preferably cushioned for safety reasons.

In a particularly preferred embodiment of the invention, the casing comprises at least one cavity constructed for receiving at least one transducer or loudspeaker and which is preferably in the form of a resonator chamber for sound amplification for a loudspeaker. In order to improve the sound radiation, the casing or cavity can have at least one sound exit opening, which can in particular be oriented in the forwards direction. As a result of the thus obtained sound radiation in a desired direction, particularly in the direction of the ear or forwards, in the case of limited power or volume of the loudspeaker excellent comprehensibility can be obtained for the operator.

The loudspeaker can be a conventional diaphragm loudspeaker, which can be inexpensively mass produced. Alternatively a piezoelectric loudspeaker can be provided, whose advantages include limited size, minimum wear susceptibility, low energy consumption, low susceptibility to electromagnetic fields occurring in a vehicle and a good frequency response corresponding well to the frequency range of human speech.

Preferably the transducer unit can be locked, particularly in self-arresting manner by means of the support between two headrest carriers and it is preferably provided with receptacles or recesses for said headrest carriers. As the spacing of the headrest carriers in the case of a vertical adjustment of the headrest remains the same, fixing advantageously takes place thereto. By means of receptacles or recesses it is possible for the transducer unit or its casing to at least partly embrace the headrest carriers and thus ensure an adequately reliable connection. In particularly preferred manner the transducer unit or its casing is length-variable, particularly in a telescopic manner. Alternatively it can have an elastic length variability of an inner area of the casing, preferably along the longitudinal axis of the casing. This permits an adaptation to different spacings of fixing points, e.g. headrest carriers. It is possible to produce a universal retrofitting set, which is usable for numerous vehicle seat variants. The transducer unit or the support can have a longitudinal spring suspension, preferably for the casing, so that it can be locked with prestress to and in particular between the headrest carriers. It can also be fixed or locked between the seatback and headrest or in a standard cutout in the headrest.

The longitudinal spring suspension assists the arresting or locking action. It is also possible to house it in the headrest.

The casing can have at least two parts, e.g. two shells. One part can be connected in articulated manner to the remaining casing and is in particular slidable or pivotable with respect thereto. One part preferably contains at least one loudspeaker, which permits an advantageous directing of the sound waves towards the ear or head. At least one sound passage opening and/or at least one loudspeaker can be orientable, e.g. in such a way that sound is emitted towards the front of the vehicle, preferably roughly in the direction of an ear of a person sitting in the seat.

Alternatively to a microphone as the sole electroacoustic transducer unit, according to a variant of the invention with a loudspeaker as the transducer can additionally be associated a microphone means. At least one microphone can be fixed to the support or casing, preferably by means of a microphone holder constructed for this purpose. Thus, in much the same way as for the loudspeaker, the microphone is advantageously located in the vicinity of the head, without it having to be held or carried by the operator.

The microphone means or holder are preferably constructed in such a way that the position and/or orientation of a microphone can be randomly fixed. This is possible by a bracket in the manner of a swanneck or in particular in the form of a flexurally non-rigid, dimensionally stable cable.

For the construction of a complete handsfree device directly connected to the electroacoustic transducer, with the latter can be associated handsfree electronics, which can in particular be placed in the casing or on the support. In conjunction with a directly associated microphone, this leads to a compact, but still easily fittable and advantageously usable handsfree device. There is no need for complicated connections to an external handsfree device. In one variant of the invention the transducer unit is connectable in signal-transmitting manner, preferably by means of a connecting cable, to a mobile telephone, car telephone or some other wireless transmission device. It is also possible to have a wireless signal transmission, e.g. through an infrared transmission path between the transducer unit and the telephone or its base or reception station.

According to a preferred development of the invention at least one loudspeaker can be fixed behind and one microphone in front of the head or mouth of a person sitting in the seat. Thus, not only are they spatially positioned close to the ear or mouth, but additionally through an interruption of a direct transmission line between loudspeaker and microphone through the head, undesired interference effects of a handsfree device such as feedback or echo are avoided.

In order to create a universal transducer unit, with it can be associated its own electric power supply and it or a support or casing can in particular have a receptacle for an insertable battery. Alternatively or additionally a power supply from the mobile telephone is possible.

A preferred construction of the invention can have an elongated, at least partly resiliently compressible casing with a loudspeaker at one end, which has two recesses at both ends, a longitudinal spring suspension being positioned in one long recess. When the longitudinal spring suspension is compressed, the transducer unit can be inserted by means of the lateral recesses between two headrest carriers of a vehicle seat and can be automatically arrested there in positively engaging manner in the vehicle longitudinal direction. Such a transducer unit is manually fixable and releasable again in simple manner. To facilitate getting into the vehicle, the part with the loudspeaker is preferably directed towards the centre of the vehicle and advantageously have a microphone means with holder. The casing can be longer than the spacing of the headrest carriers and is inserted in inclined manner.

For fitting to vehicle seats, e.g. to headrests without carriers, e.g. integral seats, it is possible to bring about fixing with a textile adhesive connection. It would be possible to loop the upper seatback area or headrest area with such an adhesive tape and the transducer unit can be fixed thereto. Another possibility is the arrangement in or on an envelope, which at least partly engages round the upper seat or headrest area and which is e.g. constructed in the manner of a textile covering or the like, together with the receptacle for the transducer unit. A permanent fixing of an electroacoustic transducer on or in a vehicle seat by screwing or the like is possible. It is possible to invisibly wire a connecting cable to a transmission device, preferably a mobile telephone, or a handsfree device within the vehicle seat or on its back.

These and other features can be gathered from the claims, description and drawings and the individual features, either singly or in the form of sub-combinations, can be implemented in an embodiment of the invention and in other fields and can represent advantageous, independently protectable constructions for which protection is claimed here. The subdivision of the application into individual sections and the subtitles in no way restrict the general validity of the statements made thereunder.

BRIEF DESCRIPTION OF THE DRAWINGS

Several embodiments of the invention are shown in the drawings, wherein represent.

DESCRIPTION OF EMBODIMENTS

Figure 1:
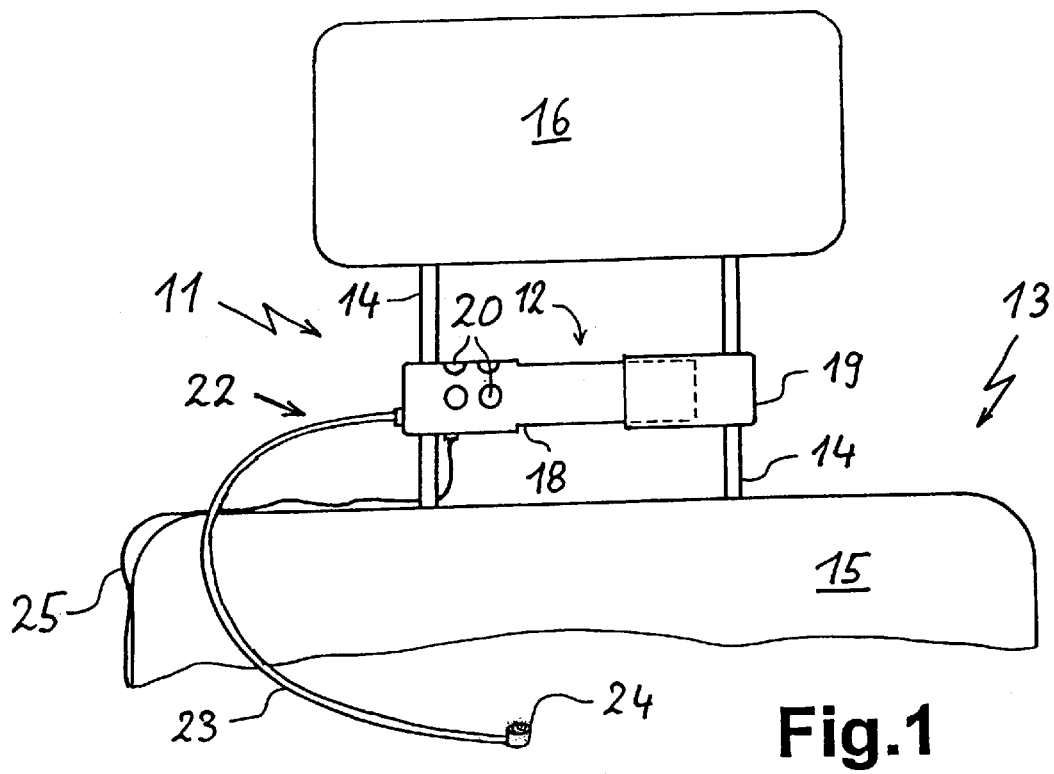
FIG. 1 A view from the front of a loudspeaker with a casing as an inventive electroacoustic transducer unit with a flexible microphone holder, which is fixed between two headrest carriers of a car seat.

FIG. 1 shows an electroacoustic transducer unit 11, whose support 12, also referred to as a casing, is fixed to a vehicle seat 13, namely on or between two headrest carriers 14, which project out of a seatback 15 and carry a headrest 16.

The casing comprises two parts, namely a loudspeaker part 18 and a casing cover 19, which passes at least partly over the loudspeaker part. Guidance preferably takes place in such a way that a relative movement of the two casing parts 18 and 19 is only possible in the longitudinal direction thereof.

In the left-hand area of the loudspeaker part 18 is provided a not shown loudspeaker in a cavity serving as a resonator chamber and by means of sound exit openings 20 the sound produced by the loudspeaker is removed from the loudspeaker part 18. Contrary to what is shown, the shape of the sound exit openings 20 is not restricted to a circular shape, all other shapes being possible and the sound exit openings can also be covered by a woven fabric or the like.

Laterally a microphone holder 22 is fitted to the loudspeaker part 18 of the casing 12 and has a long, thin, flexible arm 23, whose free end carries a microphone 24. It roughly faces the headrest 16, because the mouth of a person sitting in the vehicle seat 13 is probably directed in this direction.

The transducer unit 11 is connected by means of a connecting cable 25. In the embodiment shown in FIGS. 1 and 2, which contains the loudspeaker, the microphone 24, the handsfree electronics and a power supply, the connecting cable 25 is merely used for connection to a mobile telephone in the form of the transmission device. As a function of the construction, this can also provide a connection of an external handsfree electronics solely to a loudspeaker and/or a microphone 24 as the electroacoustic transducer in the casing 12.

Figure 2:
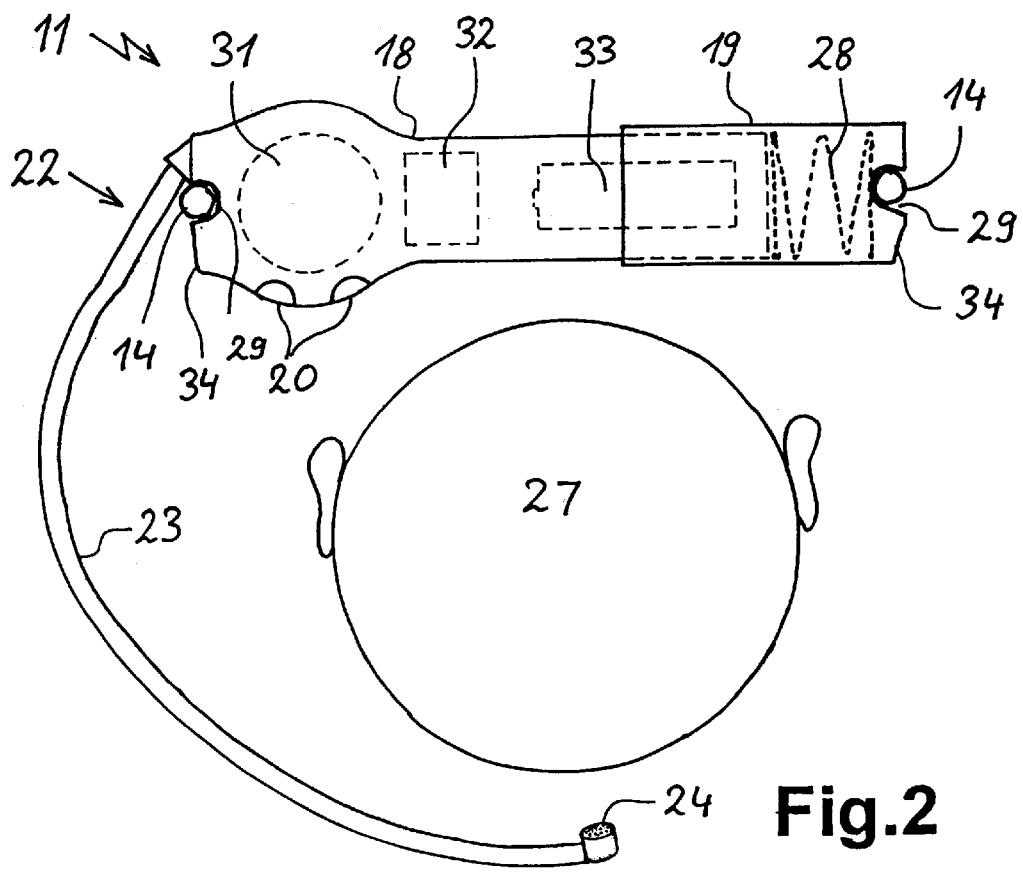
FIG. 2 The transducer unit with casing from FIG. 1 seen from above, together with the diagrammatically represented head of a person sitting in the seat.

FIG. 2 shows on a larger scale from above the device of FIG. 1, together with a diagrammatically represented head 27 of a user. This clearly shows the two-part construction of the casing 12 with loudspeaker part 18 and casing cover 19. The loudspeaker part 18 at least partly engages in the mainly hollow casing cover 19 and is spring-suspended by means of a helical spring 28 engaging on an end face and pressing against the bottom of the casing cover 19. This makes it possible to vary within a wide range the length of the casing 12 and consequently the spacing of the recesses 29 located on the lateral ends of the casing, which permits an adaptation to different spacings of the headrest carriers 14 for different vehicle seat models. Moreover, in conjunction with the specific shaping of the recesses 29, at least in the vehicle longitudinal direction (corresponds in FIG. 2 to the longitudinal direction of the sheet from top to bottom), there is a positive connection of the casing 12 to the headrest carriers 14. As a result of the slightly rearwardly drawn recesses 29, there is a reinforcement of the arresting action of the carriers 14 with the recesses 29 in a vehicle with respect to a force action occurring from the rear, from above in FIG. 2. This improves the accident security, because the transducer unit 11 or casing 12 cannot become detached in the case of a rear end collision and cannot injure a person located in the vehicle or seat.

In FIG. 2, a diaphragm loudspeaker 31 is shown in broken line form in the thicker portion of the loudspeaker part 18 and its sound produced in the loudspeaker resonator chamber is emitted via the sound passage opening 20 directly towards the head 27 of an operator. In the loudspeaker part 18 are also shown in broken line form handsfree electronics 32 and a battery 33, so that in conjunction with the microphone 24 a compact handsfree device is provided. It is merely necessary to produce by means of the connecting cable 25 a signal-transmitting connection with a mobile telephone as the transmission device.

As can be seen in FIG. 2, for increasing safety the microphone holder 22 is fitted at a point behind the recess 29 in the loudspeaker part 18, where it prevents a movement of the casing 12 in this area in front of the headrest carrier 14 towards the head 27.

Figure 3:
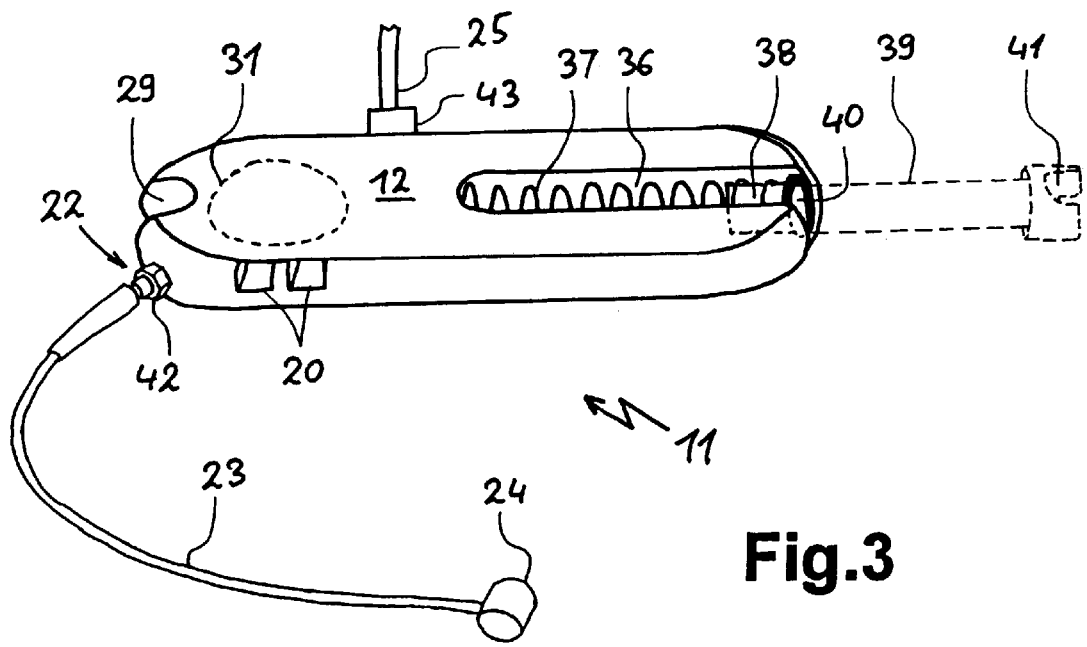
FIG. 3 An alternative construction, in which a spring suspension is fitted in a lateral longitudinal slot of the casing.

FIG. 3 shows in an inclined view an alternative embodiment, in which in a lateral longitudinal slot 36 is located a long spiral spring 37, which engages at the left on the casing 12. Towards the outlet of the slot is inserted a nipple 38, with which the spiral spring 37 can engage on a headrest carrier. A length adaptor 39 is shown in broken line form and can be inserted in an opening 40 in the nipple 38 when the headrest carriers are particularly far apart. The length adaptor has at its free end a recess 41 similar to the other recesses 29.

The casing contains in broken line form a loudspeaker 31 and two sound exit openings 20. By means of a screw connection 42 a microphone holder 22 is fixed and connected with a flexible arm 23 carrying the microphone 24. The connecting cable 25 is connected to a plug 43 on the remote longitudinal side, which in the fitted state is directed towards the vehicle rear.

The longitudinal slot 36 is narrower than the diameter of the spiral spring and is hollowed out on its inner walls, so that the spiral spring 37 and nipple 38 are reliably guided in the slot and cannot be pressed out. Not shown stops on the outer end of the slot 36 hold the spring and nipple in the casing 12.

Figure 4:
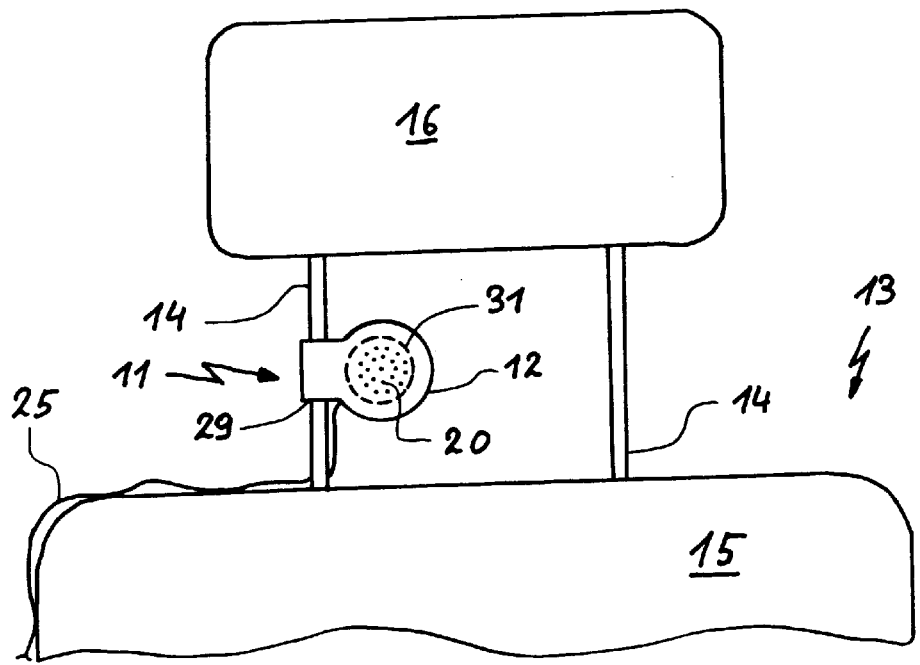
FIG. 4 A minimum construction of a loudspeaker as a transducer unit according to the invention for fitting to a headrest carrier of a vehicle seat.

FIG. 4 shows a particularly simple, inexpensive minimum version of an inventive electroacoustic transducer unit 11. It comprises a casing 12, which essentially contains a loudspeaker, here a diaphragm loudspeaker 31, and is only fixed to one headrest carrier 14, preferably by clipping, clamping or screwing. For this purpose it is possible to provide on one casing side a recess 29, which has a width smaller than the diameter of the headrest carrier 14 and which is subsequently undercut in widening manner. The cross-section of the undercut roughly corresponds to the cross-section of the headrest carrier 14 or slightly exceeds the same. Screwing is possible with a type of clamping collar. Such a loudspeaker in transducer form is merely connected by means of a connecting cable 25, which leads to a handsfree device with microphone.

FUNCTION

As an application of the invention forms a retrofitting set for the owner of a mobile telephone who wishes to install in his car a handsfree device, an electroacoustic transducer unit is preferably constructed in accordance with FIGS. 1 to 3. The manufacturer installs and connects the loudspeaker 31 and handsfree electronics 32 in the loudspeaker part 18 and connection takes place with a connecting cable 25 and microphone 24. The microphone 24 is preferably connected to the handsfree electronics 32 by means of a coaxial cable located in the arm 23 of the microphone holder 22, which in one variant of the invention can essentially form the arm. The casing cover 19 contains no components or subassemblies necessary for the function of the handsfree device. Together with the spring 28, it merely forms a type of length adaptor for the casing 12 and an arresting possibility for the overall device.

In order to put into operation, a user merely places a battery or the like in the casing 12 or loudspeaker part 18, which can advantageously be locked independently of a casing cover 19. He then closes the casing and passes the casing cover containing the helical spring over the end of the loudspeaker part and inserts the casing 12 from the rear between the two headrest carriers 14 of the vehicle seat 13. On fitting he must compress the casing 12 or longitudinal spring suspension to the extent that it can be guided between the headrest carriers 14 until the recesses 29/36 at least partly engage round the headrest carriers. This insertion can be facilitated by a bevel 34 of the ends of the casing 12 in the insertion direction or the casing is inserted in tilted manner in a perpendicular plane. Through the release of the casing parts, due to the spring tension of the longitudinal spring suspension, they are forced apart and reliably secure the casing 12 on the headrest carriers 14.

As a function of the head position, the loudspeaker means 11 can be brought along the headrest carriers 14 into an optimum position for the operator. It is subsequently merely necessary to connect the connecting cable 25 to the mobile telephone or its base station in the vehicle. As shown in FIG. 1, the microphone 24 together with most of the support arm 23 can be located somewhat below the headrest 16 and consequently the head 27. This offers the advantage that in the case of an accident, optionally involving the release of an airbag, the microphone 24 is not located directly in front of the head 27 or face and consequently does not constitute an injury source. The injury risk is reduced even further by a cushioning product.

An electroacoustic transducer unit 11 with casing 12 according to FIG. 4 is fixed to a headrest carrier 14 in the described manner, e.g. by snapping on or screwing and can be connected to a handsfree device by the connecting cable 25. For safety reasons, fixing preferably takes place in such a way that the casing 12 cannot readily rotate with respect to the headrest carrier 14 or become detached therefrom.

What is claimed is:

1. An electroacoustic transducer unit for a handsfree device in a vehicle particularly for connection to a mobile telephone as the transmission device, wherein a microphone means with at least one microphone is associated with said transducer unit and said transducer unit is constructed for positioning in the upper seatback area of a seat, has at least one support and has a spring suspension for locking with initial stress, wherein said support is constructed for fixing said transducer unit in the vicinity of a headrest of said seat between said headrest and said seatback.

2. Electroacoustic transducer unit according to claim 1, comprising at least one loudspeaker.

3. Electroacoustic transducer unit according to claim 1, wherein said unit is lockable in self-arresting manner between two headrest carriers of said seat.

4. Electroacoustic transducer unit according to claim 1, comprising a casing with at least one loudspeaker.

5. Electroacoustic transducer unit according to claim 4, wherein said casing has a cavity formed for receiving said at least one loudspeaker and having at least one sound exit opening.

6. Electroacoustic transducer unit according to claim 5, wherein said sound exit opening is oriented in the direction of vehicular travel.

7. Electroacoustic transducer unit according to claim 4, wherein a loudspeaker is adjustable with respect to said casing.

8. Electroacoustic transducer unit according to claim 1, wherein said casing has at least two parts, one of said parts being connected in articulated manner to the remaining casing.

9. Electroacoustic transducer unit according to claim 1, comprising a microphone holder for said microphone, said holder being constructed in such a way that the position and orientation of said microphone is fixable in variable manner.

10. Electroacoustic transducer unit according to claim 9, wherein said microphone holder is constructed as a flexible bracket.

11. Electroacoustic transducer unit according to claim 1, wherein a handsfree electronics is associated therewith.

12. Electroacoustic transducer unit according to claim 11, wherein said handsfree electronics is housed in a casing of said transducer unit.

13. Electroacoustic transducer unit according to claim 1, wherein said unit has an insertable battery as its own power supply.

14. Electroacoustic transducer unit according to claim 1, wherein said unit is connectable in signal-transmitting manner to a mobile or car telephone by means of a connecting cable.

15. Electroacoustic transducer unit according to claim 1, wherein said unit has a shock absorbing casing on at least one outside.

16. An electroacoustic transducer unit for a handsfree device in a vehicle, particularly for connection to a mobile telephone as the transmission device, wherein a microphone means with at least one microphone is associated with said transducer unit and said transducer unit is constructed for positioning in the upper seatback area of a seat, has at least one support and has a spring suspension for locking with initial stress, wherein said support is part of a casing and is constructed for fixing to at least one headrest carrier of a headrest of said seat and wherein the length of at least part of said casing is variable.

17. Electroacoustic transducer unit according to claim 16, wherein said unit comprises at least one loudspeaker.

18. Electroacoustic transducer unit according to claim 16, wherein said unit is lockable in self-arresting manner between two headrest carriers of said seat.

19. Electroacoustic transducer unit according to claim 16, wherein said unit comprises a casing with at least one loudspeaker.

20. Electroacoustic transducer unit according to claim 19, wherein said casing has a cavity formed for receiving said at least one loudspeaker and having at least one sound exit opening.

21. Electroacoustic transducer unit according to claim 20, wherein said sound exit opening is oriented in the direction of vehicular travel.

22. Electroacoustic transducer unit according to claim 16, wherein said casing has at least two parts, one of said parts being connected in articulated manner to the remaining casing.

23. Electroacoustic transducer unit according to claim 16, wherein a loudspeaker is adjustable with respect to said casing.

24. Electroacoustic transducer unit according to claim 16, comprising a microphone holder for said microphone, being constructed in such a way that the position and orientation of said microphone is fixable in variable manner.

25. Electroacoustic transducer unit according to claim 24, wherein said microphone holder is constructed as a flexible bracket.

26. Electroacoustic transducer unit according to claim 16, wherein a handsfree electronics is associated therewith.

27. Electroacoustic transducer unit according to claim 26, wherein said handsfree electronics is housed in a casing of said transducer unit.

28. Electroacoustic transducer unit according to claim 16, wherein said unit includes an insertable battery as its own power supply.

29. Electroacoustic transducer unit according to claim 16, wherein said unit is connectable in signal-transmitting manner to a mobile or car telephone by means of a connecting cable.

30. Electroacoustic transducer unit according to claim 16, wherein said unit comprises a shock absorbing casing on at least one outside surface thereof.

* * * * *